(12) United States Patent
Benning et al.

(10) Patent No.: US 7,116,738 B1
(45) Date of Patent: Oct. 3, 2006

(54) DATA SYNCHRONIZATION APPARATUS AND METHOD

(75) Inventors: Michael A. Benning, Roseville, CA (US); Mick R. Jacobs, Auburn, CA (US)

(73) Assignee: Cisco Technology, Inc., San Jose, CA (US)

( * ) Notice: Subject to any disclaimer, the term of this patent is extended or adjusted under 35 U.S.C. 154(b) by 710 days.

(21) Appl. No.: 10/272,250

(22) Filed: Oct. 15, 2002

Related U.S. Application Data

(60) Provisional application No. 60/329,118, filed on Oct. 12, 2001.

(51) Int. Cl.
*H04L 7/00* (2006.01)
*H04K 1/00* (2006.01)
*G06F 7/52* (2006.01)

(52) U.S. Cl. .................. 375/354; 380/272; 708/655
(58) Field of Classification Search ............... 375/354; 380/272; 708/655
See application file for complete search history.

(56) References Cited

U.S. PATENT DOCUMENTS

| | | | | | |
|---|---|---|---|---|---|
| 3,875,344 | A | * | 4/1975 | Bogart | 375/240 |
| 4,380,051 | A | * | 4/1983 | Fette | 708/655 |
| 5,155,486 | A | * | 10/1992 | Murfet et al. | 341/100 |
| 5,546,464 | A | * | 8/1996 | Raith et al. | 380/272 |
| 5,638,370 | A | * | 6/1997 | Seconi et al. | 370/466 |
| 6,266,710 | B1 | * | 7/2001 | Dittmer et al. | 710/1 |
| 2001/0043187 | A1 | * | 11/2001 | Ikeda | 345/100 |

* cited by examiner

*Primary Examiner*—Khai Tran
*Assistant Examiner*—Cicely Ware
(74) *Attorney, Agent, or Firm*—Campbell Stephenson Ascolese LLP

(57) ABSTRACT

Disclosed is a method and apparatus for synchronizing data. In one embodiment, the apparatus includes a first communication link for transmitting first data and a second communication link for transmitting second data. A circuit coupled to the first and second communication links. The circuit is configured to receive the first and second data. The circuit is configured to synchronously output the first and second data when the first and second data are received by the circuit out of synchronization.

20 Claims, 4 Drawing Sheets

| B | A | D |
|---|---|---|
| $B_1$ | $A_1$ | $D_1$ |
| $B_2$ | $A_2$ | $D_2$ |
| $B_3$ | $A_3$ | $D_3$ |

|   |   | $B_1$ | $A_1$ | $D_1$ | • | • |
|---|---|---|---|---|---|---|
| • | $B_2$ | $A_2$ | $D_2$ | • |
| $B_3$ | $A_3$ | $D_3$ | • | • |

| $B_1$ | $A_1$ | $D_1$ |
|---|---|---|
| $B_2$ | $A_2$ | $D_2$ |
| $B_3$ | $A_3$ | $D_3$ |
| B | A | D |

DATA SYNCHRONIZATION APPARATUS AND METHOD

This application claims the benefit of Provisional Patent Application Serial No. 60/329,118, filed on Oct. 12, 2002, entitled, "SERIAL LINK SYNCHRONIZATION METHOD." The above-referenced application is hereby incorporated by reference herein in its entirety.

BACKGROUND OF THE INVENTION

Communication channels are employed in communication systems. Communication channels transmit multi-bit data between, for example, a line card and a switching fabric. FIG. 1 illustrates relevant components (shown in block diagram form) of an exemplary communication channel 10. Communication channel 10 and the written description thereof should not be considered prior art to the invention described and/or claimed herein.

Communication channel 10 includes communication paths 12–16 coupled between an input node 18 and an output node 20. Communication paths 12–16 include transmitter circuits 22–26, respectively, coupled to receiver circuits 32–36, respectively, via serial communication links 42–46, respectively.

A stream of N-bit input data is provided to input node 18. Each N-bit input data is divided into three N/3-bit data portions. The N/3-bit data portions are synchronously provided to respective inputs of transmitters 22–26. Transmitters 22–26 transmit their respective N/3-bit data portion to receivers 32–36, respectively, in a bit-by-bit fashion over serial links 42–46, respectively. Receivers 32–36 output respective N/3 data portions in parallel format. The N/3-bit data portions from receivers 32–26 are concatenated to form N-bit output data at output node 20.

A time delay exists in the transmission of the N/3-bit data portions through each of the communication paths 12–16. If communication paths 12–16 were identical in structure and if communication paths 12–16 operated under identical conditions, the transmission delays through communication paths 12–16 would be identical. Unfortunately, communication paths 12–16 vary in physical structure and operating conditions. For example, serial links 42–46 may consist of traces on a printed circuit board. The traces may vary in length. Further, each of the transmitter circuits 22–26 is provided with a power supply. Unfortunately, the magnitude of the power supply voltage may vary between transmitter circuits 22–26. Receiver circuits 32–36 may operate at different temperatures. Transmitter circuits 22–26 and receiver circuits 32–36 operate in accordance with a clock signal provided thereto. Unfortunately, the distribution of the clock signal between, for example, transmitter circuits 22–26 may be uneven such that the rising and falling edges of the clocks to transmitter circuits 22–26 may be skewed with respect to each other. Transmitters 22–26 may be formed on the same integrated circuit, and the conductive paths that transmit the clock signal to transmitter circuits 22–26 may be uneven in length from the source of the clock signal. The difference in conductor lengths may cause skew between clock signals provided to transmitter circuits 22–26. Each link 42–46 may operate according to a unique clock domain. Clock domain crossing is another source of variation between links 42–46. Lastly, transmitters 22 and 26 should be identical in physical structure to each other. Unfortunately, variations in the process to manufacture components (e.g., transistors) within transmitters 22–26, may result in physical differences between transmitters 22–26.

The aforementioned physical structure and/or operating condition variations may result in relative transmission delays between communication paths 12–16. For purposes of explanation, it will be presumed that the transmission delays of communication paths 14 and 16 are greater than the transmission delay of communication path 12, and that the transmission delay of communication path 16 is greater than the transmission delay of communication path 14 due to physical structure and/or operating condition variations. To illustrate the effect of these relative transmission delays between communication channels 12–16, suppose an N-bit input data value A is provided to input node 18 at time $t_1$. A is divided into N/3-bit data portions $A_1$, $A_2$, and $A_3$. $A_1$, $A_2$, and $A_3$ are synchronously input into communication paths 12–16, respectively. Because of the presumed relative time delays between communication paths 12–16, $A_2$ outputs from communication path 14 one clock cycle after $A_1$ outputs from communication path 12, and $A_3$ outputs from communication path 16 two clock cycles after $A_1$ outputs from communication path 12. Thus, $A_1$–$A_3$ emerge from communication paths 12–16, respectively, out of synchronization. Because $A_1$–$A_3$ are out of synchronization, $A_1$–$A_3$ cannot be concatenated in communication path 10 to reproduce A at output node 20.

SUMMARY OF THE INVENTION

Disclosed is a method and apparatus for synchronizing data. In one embodiment, the apparatus includes a first communication link for transmitting first data and a second communication link for transmitting second data. A circuit coupled to the first and second communication links. The circuit is configured to receive the first and second data. The circuit is configured to synchronously output the first and second data when the first and second data are received by the circuit out of synchronization.

BRIEF DESCRIPTION OF THE DRAWINGS

The present invention may be better understood, and its numerous objects, features, and advantages made apparent to those skilled in the art by referencing the accompanying drawings.

FIG. 4 illustrates the effects of synchronization circuit shown in FIG. 3,

The use of the same reference symbols in different drawings indicates similar or identical items.

DETAILED DESCRIPTION

Figure 2:
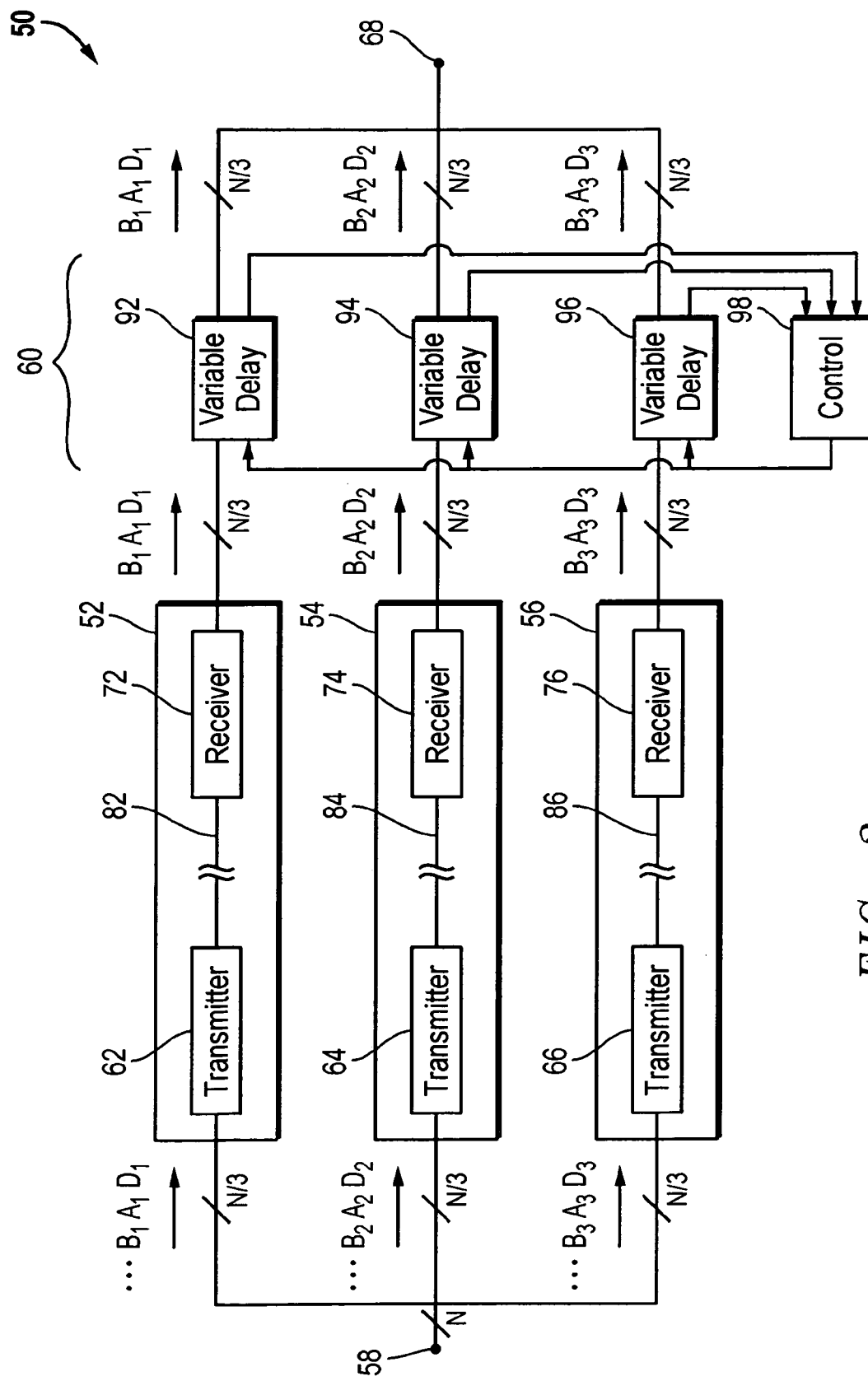
FIG. 2 is a block diagram of a communication channel employing one embodiment of the present invention.

FIG. 2 illustrates (in block diagram form) a communication channel 50 employing one embodiment of the present invention. The communication channel 50 includes communication paths 52–56 coupled between an input node 58 and a synchronization circuit 60. Synchronization circuit 60, in turn, is coupled to output node 68. Although communication channel 50 is shown with three communication paths, the present invention can be employed in a communication channel having fewer or more than three communication paths.

Communication paths 52–56 include transmitter circuits 62–66, respectively coupled to receiver circuits 72–76, respectively, via serial communication links 82–86, respectively. The present invention will be described with reference to serial communication links coupled between transmitter circuits 62–66 and receiver circuits 72–76, it being understood that the present invention may find application to a communication channel having transmitter circuits coupled to receiver circuits via respective parallel communication links. Two devices may be coupled together either directly or indirectly. For example, receiver circuit 72 is coupled to synchronization circuit 60, and transmitter circuit 62 is coupled to synchronization circuit 60, although transmitter circuit 62 is coupled to synchronization circuit 60 via serial communication link 82 and receiver 72.

Figure 1:
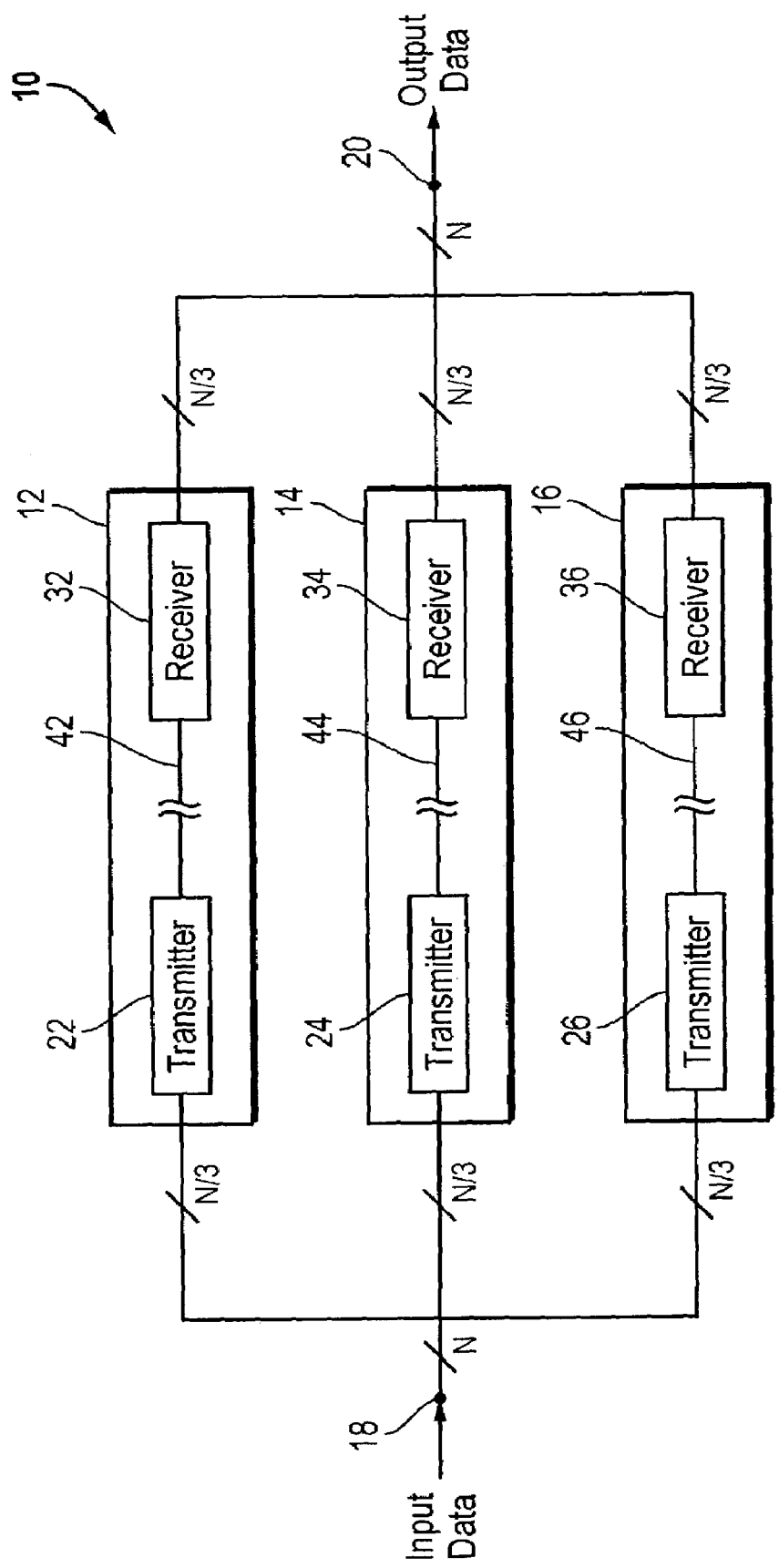
FIG. 1 is a block diagram of a communication channel.

Communication paths 52–56 operate in a manner similar to the communication paths 12–16 described in FIG. 1. A stream of N-bit input data is provided to input node 58. Each N-bit input data is divided into three N/3-bit data portions. The N/3-bit data portions are synchronously provided to respective inputs of transmitters 52–56. Transmitters 52–56 transmit their respective N/3-bit data portion to receivers 32–36, respectively, in a bit-by-bit fashion over serial links 42–46, respectively. In one embodiment, transmitters 52–56 transmit their respective N/3-bit data portions at 3.125 Gbit/sec using 8B10B encoding. Receivers 72–76 output respective N/3-bit data portions in parallel format to synchronization circuit 60.

Like communication paths 12–16 in FIG. 1, variations in transmission delays exist between communication paths 52–56 as a result of variations in physical structure and/or operating conditions between communication paths 52–56. For purposes of explanation, it will be presumed that the transmission delays of communication paths 54 and 56 are greater than the transmission delay of communication path 52, and that the transmission delay of communication path 56 is greater than the transmission delay of communication path 54. To illustrate the effect, suppose an N-bit input data value A is provided to input node 18 at time $t_1$. A is divided into N/3-bit data portions $A_1$, $A_2$, and $A_3$. $A_1$, $A_2$, and $A_3$ are synchronously input into communication paths 52–56, respectively. Because of the presumed relative time delays between communication paths 52–56, $A_2$ outputs from communication path 54 one clock cycle after $A_1$ outputs from communication path 52, and $A_3$ outputs from communication path 56 two clock cycles after $A_1$ outputs from communication path 52. Thus, although N/3 data portions enter respective communication paths 52–56 in synchronous fashion, N/3 data portions exit respective communication paths 52–56 out of synchronization.

Synchronization circuit 60 includes variable delay circuits 92–96 coupled between the outputs of receiver 72–76, respectively, and output node 68. Additionally, synchronization circuit 60 includes control circuit 98 coupled to variable delay circuits 92–96. Synchronization circuit 60 operates to resynchronize the N/3 data bit portions that emerge from the communication paths 52–56. Continuing the example above, N/3-bit data portions $A_1$, $A_2$, and $A_3$ enter variable delay circuits 92–96, respectively, out of synchronization. Variable delay circuits 92–96 operating under control of control circuit 98, resynchronize N/3-bit data portions $A_1$, $A_2$, and $A_3$ such that N/3-bit data portions $A_1$, $A_2$, and $A_3$ emerge from variable delay circuits 92–96, respectively, in synchronization. Because N/3-bit data portions $A_1$, $A_2$, and $A_3$ are once again synchronized, N/3-bit data portions $A_1$, $A_2$, and $A_3$ can be concatenated to form the original N-bit input data A at output node 68.

Synchronization circuit 60 operates in two modes: variable delay circuit configuration mode and synchronization mode. In configuration mode, variable delay circuits can be configured with a transmission delay that offsets the variations in transmission delay in communication paths 52–56. After configuration mode (i.e., in the synchronization mode) variable delay circuits 92–96 synchronize the unsynchronized N/3-bit data portions emerging from communication paths 52–56, respectively.

Configuration mode is initiated with a configuration command provided to control circuit 98, and/or transmitters 62–66. It is noted that configuration mode can be initiated more than once. For example, configuration mode can be initiated each time there is a change in operating variations (e.g., change in temperature distribution among transmitters 62–66 or receivers 72–76) in communication paths 52–56 that causes a change in the relative transmission delays between communication paths 52–56.

Figure 3:
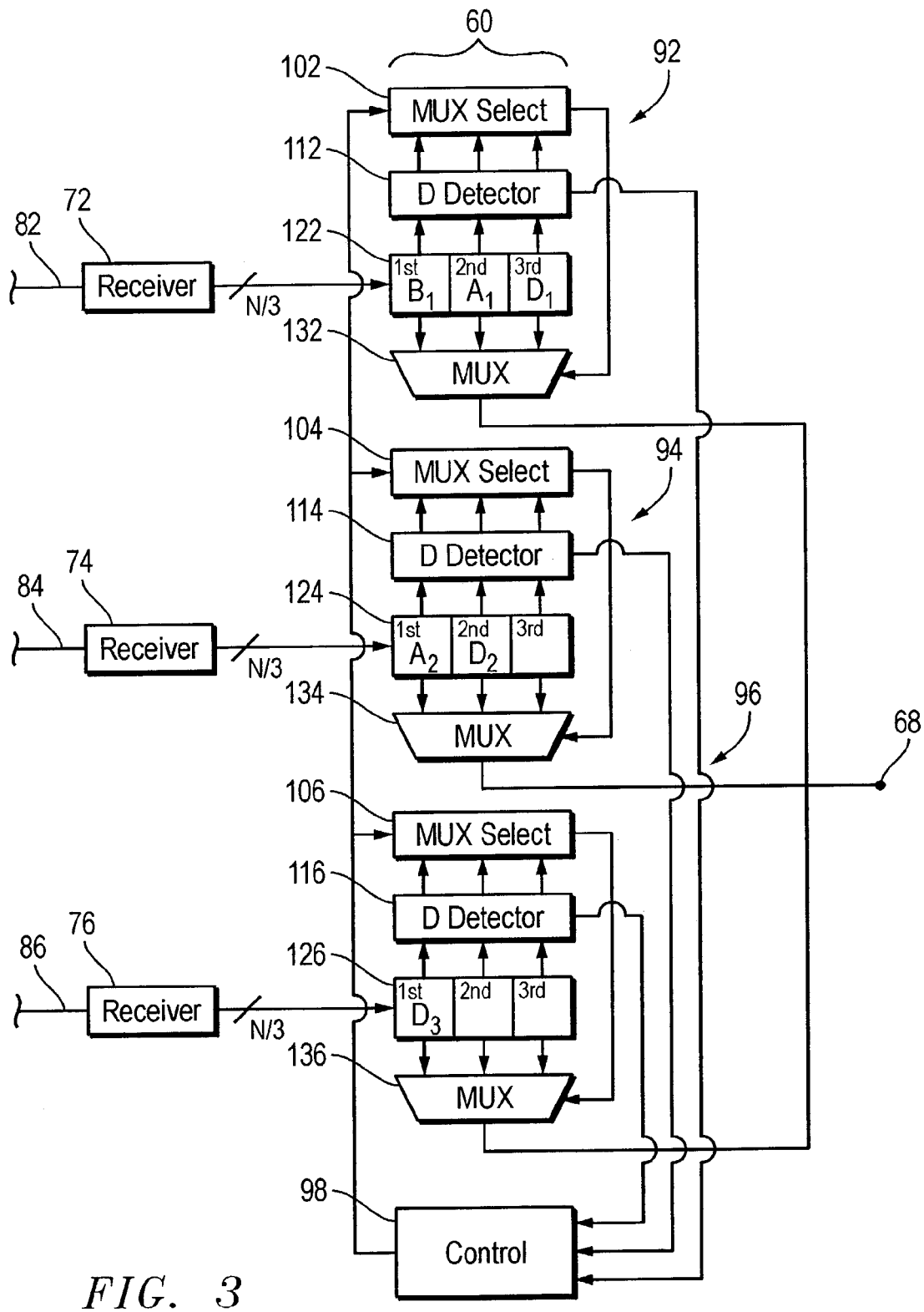
FIG. 3 is a block diagram of one embodiment of the synchronization circuit shown in FIG. 2.

FIG. 3 is block diagram illustrating relevant components of one embodiment of the synchronization circuit 60 shown in FIG. 2. As seen in FIG. 3, variable delay circuits 92–96 include multiplexer selection circuits 102–106, respectively, delimiter detector circuits 112–116, respectively, shift registers 122–126, respectively, and multiplexers 132–136, respectively.

Each of the shift registers 122–126 includes three shift register stages designated $1^{st}$, $2^{nd}$, and $3^{rd}$. Shift registers 122–126 may have more or less than three stages in other embodiments. Each shift register stage is at least N/3-bits wide and capable of storing an N/3-bit data portion until shifted to the next stage or out of the shift register. In another embodiment, each shift register stage may be wider than N/3-bits. Each shift register stage includes an input and an output. The inputs of the $1^{st}$ stages are coupled to the outputs of receivers 72–76, respectively. Thus, the $1^{st}$ or input stages of each shift register receive the unsynchronized N/3 bit data portions emerging from receivers 74–76. The outputs of the $1^{st}$ stages are coupled to first inputs of delimiter detector circuits 112–116, respectively, first inputs of multiplexers 132–136, respectively, and inputs of the $2^{nd}$ stages of shift registers 122–126, respectively. The outputs of the $2^{nd}$ stage of shift registers 122–126 are coupled to second inputs of delimiter detector 112–116, respectively, second inputs of multiplexers 132–136, respectively, and inputs of the $3^{rd}$ stages of shift registers 122–126, respectively. The output of the $3^{rd}$ stages of shift registers 122–126 are coupled to third inputs of delimiter detector circuits 112–116, respectively, and third inputs of multiplexers 132–136, respectively.

Shift registers 122–126 operate under well-known principles. More particularly, N/3-bit data portions provided by receivers 72–76 are shifted between stages of shift registers 122–126 on the rising edge, the falling edge, or both the rising and falling edge of a clock signal provided to the shift registers 122–126. It is noted that the clock signal provided to shift registers 122–126 may be the same as or different from the clock signal provided to receivers 72–76. For example, the frequency jitter of the clock signal provided to shift registers 122–126 may be different than the frequency jitter of the clock signal provided to receivers 72–76. For purposes of explanation, the same clock signal will be provided to receivers 72–76 and shift registers 122–126.

Delimiter detector circuits (delimiter detectors) 112–116 monitor the data contents of shift registers 122–126, respectively. More particularly, delimiter detectors 112–116 generate respective delimiter detection signal in response to detecting the presence of N/3-bit delimiters $D_1$–$D_3$, respectively within shift registers 122–126, respectively. Delimiters $D_1$–$D_3$ will be more fully described below. The delimiter detection signals are subsequently provided to control circuit 98. Additionally, delimiter detectors 112–116 generate binary signals that identify the stages of the shift registers 122–126, respectively, that store delimiter signals $D_1$–$D_3$, respectively. For example, delimiter detector 112 generates a binary signal (e.g., two bit signal equal to binary 3) when $D_1$ is detected in the $3^{rd}$ stage of shift register 122. The binary signals are subsequently provided to respective multiplexer selection circuits 102–106.

Control circuit 98, after receiving the configuration command mentioned above, generates a SYNC signal in response to control circuit 98 receiving delimiter detection signals from all delimiter detection circuits 112–116. In one embodiment, the SYNC signal is generated immediately after control circuit 98 receives a delimiter detection signal from all delimiter detectors 112–114. Each of the multiplexer selection circuits 102–106 generates a MUX select signal in response to receiving the SYNC signal from control circuit 98. As an aside, all MUX select signals, in one embodiment, are simultaneously generated by multiplexer selection circuits 102–106 in response to receiving the SYNC signal from control circuit 98. Each MUX select signal, in one embodiment, consists of a two-bit binary signal. Each MUX select signal is generated as a function of respective binary signal provided by delimiter detectors 112–116. In one embodiment, multiplexer selection circuits 102–106 may simply forward the binary signals generated by delimiter detectors 112–116, respectively, as respective MUX select signals. Once generated, the same MUX signals are continuously provided to respective selector inputs of multiplexers 132–136 until the configuration mode mentioned above is reinitiated.

Multiplexers 132–134 output the N/3-bit data contents of one of the stages of shift registers 122–126, respectively, according to the MUX select signal received from multiplexer select circuits 102–106, respectively. For example, multiplexer 132 outputs the contents of the $3^{rd}$ stage (coupled to the third input of multiplexer 132 via the output of the $3^{rd}$ stage) of shift register 122 in response to receiving a MUX select signal equal to binary 3 from multiplexer select circuit 102.

Operational aspects of the configuration mode will be explained with reference to FIGS. 2 and 3. As noted above, configuration mode is initiated with the issuance of the configuration command. In one embodiment, after the configuration command is issued, an N-bit delimiter D is provided to input node 58. This delimiter is divided into the N/3-bit delimiter portions $D_1$–$D_3$. Delimiters $D_1$–$D_3$ take form in predetermined N/3-bit values. It is noted that $D_1$–$D_3$ may be identical in value or different in value. For purposes of explanation, it will be presumed that $D_1$–$D_3$ are identical N/3-bit values. Delimiter D may be used to designate the boundaries between successively transmitted data frames.

$D_1$–$D_3$ synchronously enter communication paths 52–56, respectively, via transmitters 62–64, respectively. Because of the presumed relative transmission delays between communication paths 52–56, $D_2$ outputs from communication path 54 one clock cycle after $D_1$ outputs from communication path 52, and $D_3$ outputs from communication path 56 two clock cycles after $D_1$ outputs from communication path 52. Accordingly, delimiters $D_1$–$D_3$ emerge from communication paths 52–56, respectively, out of synchronization.

In an alternative embodiment, delimiters $D_1$–$D_3$ may be internally generated by and subsequently transmitted in synchronization by transmitters 52–56, respectively, in response to transmitters 62–66 receiving the configuration command. For purposes of explanation, delimiters $D_1$–$D_3$ will be synchronously input into communication paths 52–56.

The delimiters $D_1$–$D_3$ enter shift registers 122–126, respectively, out of synchronization after emerging from receivers 72–76, respectively. For purposes of explanation, FIG. 3 shows the contents of shift registers 122–126 at a point in time when all three delimiters $D_1$–$D_3$ are contained therein.

Delimiter detectors 112–126 generate delimiter detection signals on detection of delimiters $D_1$–$D_3$, respectively, in shift registers 122–126, respectively. In one embodiment, although the detection signals change as the delimiters shift through the shift registers, the detection signals are continuously asserted by the delimiter detectors 112–126 while delimiters $D_1$–$D_3$ are in shift registers 122–126, respectively. At the point in time shown in FIG. 3, delimiter detectors 112–126 generate binary signals equal to binary 3, binary 2, and binary 1, respectively, thus indicating that delimiters $D_1$–$D_3$ are contained within the third stage of shift register 122, the second stage of shift register 124, and the first stage of shift register 126, respectively.

Control circuit 98 receives the three delimiter detection signals from delimiter detectors 112–126. After control circuit 98 receives all three delimiter detection signals, control circuit 98 generates the SYNC signal mentioned above. The SYNC signal is provided simultaneously to each of the multiplexer selection circuits 102–106. Multiplexer selection circuits 102–106 simultaneously generate MUX signals equal to binary 3, binary 2, and binary 1, respectively, in response to receiving the SYNC signal from control circuit 98 and in response to receiving binary signals equal to binary 3, binary 2, and binary 1, respectively, from delimiter detectors 112–116, respectively.

The MUX signals are provided to control inputs of multiplexers 132–136. Multiplexers 132–136 output delimiters $D_1$–$D_3$ according to the MUX select signals received from MUX selection circuits 102–106, respectively. It is noted that delimiters $D_1$–$D_3$ emerge from multiplexers 132–136, respectively, in synchronization. The delimiters $D_1$–$D_3$ are concatenated and provided to output node 68 as delimiter D.

Once the MUX select signals are provided to multiplexers 132–136, respectively, variable delay circuits 102–106 are configured to compensate for the variation in transmission delays between communication paths 52–56, respectively. In the example illustrated in FIG. 3, MUX select signals equal to binary 3, 2, and 1 are continuously provided to multiplexers 132–136, respectively, after delimiters $D_1$–$D_3$ emerge from multiplexers 132–136, respectively. With these MUX select signals provided to multiplexers 132–136, unsynchronized N/3-bit data portions entering shift registers 122–126 emerge from multiplexers 132–136 in synchronization. N/3-bit data portions that follow delimiter $D_1$ and enter shift register 122, emerge from variable delay circuit 102 via the $3^{rd}$ stage of shift register 122 and the third input of multiplexer 132; N/3-bit data portions that follow delimiter $D_2$ and enter shift register 124, emerge from variable delay circuit 104 via $2^{nd}$ stage of shift register 124 and the second input of multiplexer 134; and N/3-bit data portions that follow delimiter $D_3$ and enter shift register 126, emerge from variable delay circuit 104 via the $1^{st}$ stage of shift register 124 and the second input of multiplexer 134.

With continuing reference to FIGS. 2 and 3, FIGS. 4A–4C illustrates the effects of synchronization circuit 60 after configuration thereof in accordance with the description above. At times $t_0$, $t_1$, and $t_2$, N-bit delimiter D, N-bit data A, and N-bit data B, respectively, are provided to input node 58 of communication channel 50. The configuration command is provided to control circuit 98 just before delimiter D is provided to input node 58. At times $t_0$, $t_1$, and $t_2$, N-bit delimiter D, N-bit data A, and N-bit data B, respectively, are divided into N/3-bit portions $D_1$–$D_3$, $A_1$–$A_3$, and $B_1$–$B_3$, respectively, and subsequently provided to transmitters 22–24, respectively, in synchronization. FIG. 4B shows the outputs of receivers 32–36. FIG. 4B shows that N/3 bit data portion outputs are unsynchronized or misaligned in time. For example, $D_1$–$D_3$ emerge from receivers 32–36, respectively, at times $t_0+d_1$–$t_2+d_1$, respectively; $A_1$–$A_3$ emerge from receivers 32–36, respectively, at times $t_1+d_1$–$t_3+d_1$, respectively, and $B_1$–$B_3$ emerge from receivers 32–36, respectively, at times at times $t_2+d_1$–$t_4+d_1$, respectively. FIG. 4C shows the outputs variable delay circuits 92–96 after configuration thereof. More particularly, FIG. 4C shows the outputs of multiplexers 132–136 after MUX signals equal to binary 3, 2, and 1 are provided to the control inputs of multiplexers 132–136, respectively, as described above. FIG. 4C shows that N/3 bit data portion outputs emerge in synchronization after passing through multiplexers 132–136. In other words, $D_1$–$D_3$ emerge from multiplexers 132–136, respectively, at time $t_0+d_2$; $A_1$–$A_3$ emerge from multiplexers 132–136, respectively, at time $t_1+d_2$, and $B_1$–$B_3$ emerge from multiplexers 132–136, respectively, at time $t_2+d_2$. Because $D_1$–$D_3$, $A_1$–$A_3$, and $B_1$–$B_3$ emerge in synchronization, $D_1$–$D_3$, $A_1$–$A_3$, and $B_1$–$B_3$ are concatenated to form D, A, and B, respectively.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. An apparatus comprising:
   a first communication link for transmitting first data;
   a second communication link for transmitting second data;
   a circuit coupled to the first and second communication links and configured to receive the first and second data,
   wherein the circuit is configured to transmit the first and second data to first and second outputs, respectively, of the circuit; and
   wherein when the first data is received by the circuit before the second data, the circuit is configured to delay transmission of the first data relative to the transmission of the second data such that the second data is received at the second output when the first output receives the first data.

2. The apparatus of claim 1 wherein the circuit further comprises:
   first and second shift registers coupled to receive the first and second data, respectively, transmitted over the first and second communication links, respectively, wherein each of the first and second shift registers comprises a plurality of shift register stages, wherein each shift register stage comprises a data input and a data output;
   first and second multiplexers are coupled to the first and second shift registers, respectively;
   wherein the first multiplexer comprises a data output and a plurality of data inputs, wherein the plurality of data inputs of the first multiplexer are coupled to data outputs of the plurality of shift register stages, respectively, of the first shift register, and;
   wherein the second multiplexer comprises a data output and a plurality of data inputs, wherein the plurality of data inputs of the second multiplexer are coupled to data outputs of the plurality of shift register stages, respectively, of the second shift register.

3. The apparatus of claim 1 wherein the circuit further comprises:
   first and second shift registers coupled to receive first and second delimiters, respectively, transmitted over the first and second communication links, respectively;
   wherein the first and second shift registers are configured to shift the first and second delimiters through their respective shift register stages.

4. The apparatus of claim 3 wherein the circuit further comprises:
   first and second multiplexers coupled to the first and second shift registers, respectively;
   wherein each of the first and second shift registers comprises a plurality of shift register stages, wherein each shift register stage comprises a data input and a data output;
   wherein the first multiplexer comprises a data output and a plurality of data inputs, wherein the plurality of data inputs of the first multiplexer are coupled to data outputs of the plurality of shift register stages, respectively, of the first shift register, and;
   wherein the second multiplexer comprises a data output and a plurality of data inputs, wherein the plurality of data inputs of the second multiplexer are coupled to data outputs of the plurality of shift register stages, respectively, of the second shift register.

5. The apparatus of claim 4 wherein the circuit further comprises:
   a first synchronization circuit coupled to the first shift register and the first multiplexer;
   a second synchronization circuit coupled to the second shift register and the second multiplexer;
   a control circuit coupled to the first and second synchronization circuits;
   wherein the first synchronization circuit generates a first signal in response to the first shift register receiving the first delimiter;
   wherein the second synchronization circuit generates a second signal in response to the second shift register receiving the second delimiter;
   wherein the control circuit is coupled to receive the first and second signals;
   wherein the control circuit generates a control signal after receiving both the first and second signals;
   wherein the first and second synchronization circuits are coupled to receive the control signal;
   wherein the first and second synchronization circuits generate first and second multiplexer control signals, respectively, in response to the first and second synchronization circuits receiving the control signal;
   wherein the first multiplexer is coupled to receive the first multiplexer control signal;
   wherein the first multiplexer couples one of its plurality of data inputs to its data output in response to the first multiplexer receiving the first multiplexer control signal;

wherein the second multiplexer is coupled to receive the second multiplexer control signal;

wherein the second multiplexer couples one of its plurality of data inputs to its data output in response to the second multiplexer receiving the second multiplexer control signal.

6. The apparatus of claim 5:

wherein the first and second synchronization circuits comprise first and second delimiter detection circuits, respectively, coupled to the first and second shift registers, respectively;

wherein the first and second delimiter detection circuits are configured to detect the presence of the first and second delimiters, respectively, within the first and second shift registers, respectively;

wherein the first and second delimiter detection circuits generate the first and second signals, respectively, in response to detecting the presence of the first and second delimiters, respectively, within the first and second shift registers, respectively.

7. An apparatus comprising:

a first means for transmitting first data;

a second means for transmitting second data;

a third means coupled to the first and second means and configured to receive the first and second data, wherein the third means is configured to transmit the first and second data to first and second outputs, respectively, of the third means;

when the first data is received by the third means before the second data, the third means is configured to delay transmission of the first data relative to the transmission of the second data such that the second data is received at the second output when the first output receives the first data.

8. The apparatus of claim 7 wherein the third means comprises:

first and second shift registers coupled to receive the first and second data, respectively, transmitted over the first and second means, respectively, wherein each of the first and second shift registers comprises a plurality of shift register stages, wherein each shift register stage comprises a data input and a data output;

first and second multiplexers are coupled to the first and second shift registers, respectively;

wherein the first multiplexer comprises a data output and a plurality of data inputs, wherein the plurality of data inputs of the first multiplexer are coupled to data outputs of the plurality of shift register stages, respectively, of the first shift register, and;

wherein the second multiplexer comprises a data output and a plurality of data inputs, wherein the plurality of data inputs of the second multiplexer are coupled to data outputs of the plurality of shift register stages, respectively, of the second shift register.

9. The apparatus of claim 7 wherein the third means comprises:

first and second shift registers coupled to receive first and second delimiters, respectively, transmitted over the first and second means, respectively;

wherein the first and second shift registers are configured to shift the first and second delimiters through their respective shift register stages.

10. The apparatus of claim 9 wherein the third means further comprises:

first and second multiplexers coupled to the first and second shift registers, respectively;

wherein each of the first and second shift registers comprises a plurality of shift register stages, wherein each shift register stage comprises a data input and a data output;

wherein the first multiplexer comprises a data output and a plurality of data inputs, wherein the plurality of data inputs of the first multiplexer are coupled to data outputs of the plurality of shift register stages, respectively, of the first shift register, and;

wherein the second multiplexer comprises a data output and a plurality of data inputs, wherein the plurality of data inputs of the second multiplexer are coupled to data outputs of the plurality of shift register stages, respectively, of the second shift register.

11. The apparatus of claim 10 wherein the third means further comprises a first synchronization circuit coupled to the first shift register and the first multiplexer;

a second synchronization circuit coupled to the second shift register and the second multiplexer;

a control circuit coupled to the first and second synchronization circuits;

wherein the first synchronization circuit generates a first signal in response to the first shift register receiving the first delimiter;

wherein the second synchronization circuit generates a second signal in response to the second shift register receiving the second delimiter;

wherein the control circuit is coupled to receive the first and second signals;

wherein the control circuit generates a control signal after receiving both the first and second signals;

wherein the first and second synchronization circuits are coupled to receive the control signal;

wherein the first and second synchronization circuits generate first and second multiplexer control signals, respectively, in response to the first and second synchronization circuits receiving the control signal;

wherein the first multiplexer is coupled to receive the first multiplexer control signal;

wherein the first multiplexer couples one of its plurality of data inputs to its data output in response to the first multiplexer receiving the first multiplexer control signal;

wherein the second multiplexer is coupled to receive the second multiplexer control signal;

wherein the second multiplexer couples one of its plurality of data inputs to its data output in response to the second multiplexer receiving the second multiplexer control signal.

12. A method comprising:

a circuit receiving first data via a first communication link;

the circuit receiving second data via a second communication link;

transmitting the first and second data to first and second outputs, respectively, of the circuit;

when the first data is received by the circuit before the second data, the circuit delaying transmission of the first data relative to the transmission of the second data such that the second data is received at the second output when the first output receives the first data.

13. The method of claim 12 further comprising:

first and second shift registers receiving first and second delimiters, respectively, transmitted over the first and second communication links, respectively;

shifting the first and second delimiters through the first and second shift registers, respectively.

14. The method of claim 13 further comprising:

generating a first signal in response to the first shift register receiving the first delimiter;

generating a second signal in response to the second shift register receiving the second delimiter;

generating a control signal after generation of both the first and second signals;

generating first and second multiplexer control signals, respectively, in response to generating the control signal;

multiplexing data contents of a stage of the first shift register onto a first output line in response to generation of the first multiplexer control signal;

multiplexing data contents of a stage of the second shift register onto a second output line in response to generation of the second multiplexer control signal.

15. The method of claim 14:

detecting the presence of the first and second delimiters, respectively, within the first and second shift registers, respectively;

wherein the first and second signals are generated in response to detecting the presence of the first and second delimiters, respectively, within the first and second shift registers, respectively.

16. A method comprising:

a first shift register receiving a first multi-bit data, wherein the first shift register comprises multiple shift register stages;

shifting the first multi-bit data through one or more stages of the first shift register;

a second shift register receiving a second multi-bit data, wherein the second shift register comprises multiple shift register stages, wherein second shift register receives the second multi-bit data before the first shift register receives the first multi-bit data;

shifting the second multi-bit data through one or more stages of the second shift register;

concatenating the first and second multi-bit data before the first and second multi-bit data are shifted into $n^{th}$ and $m^{th}$ stages of the first and second shift registers, respectively, wherein m is greater than n.

17. A method comprising:

transmitting first and second delimiters over first and second communication links, respectively;

inputting the first delimiter into an input stage of a first shift register after transmitting the first delimiter over the first communication link, wherein the first shift register comprises multiple stages;

generating a first delimiter detection signal in response to inputting the first delimiter into the input stage of the first shift register;

shifting the first delimiter into another stage of the first shift register;

inputting the second delimiter into an input stage of a second shift register after transmitting the second delimiter over the second communication link, wherein the second shift register comprises multiple stages;

generating a second delimiter detection signal in response to inputting the second delimiter into the input stage of the second shift register;

concatenating the first delimiter stored in the another stage of the first register with the second delimiter stored in the input stage of the second shift register, wherein the first and second delimiters are concatenated in response to generating the first and second delimiter detection signals.

18. The method of claim 16 further comprising:

the first and second shift registers receiving first and second delimiters, respectively, wherein the second shift register receives the second delimiter before the first delimiter is received by the first shift register;

shifting the first and second delimiters through one or more stages of the first and second shift registers, respectively.

19. The method of claim 18 further comprising:

generating a first signal in response to the first shift register receiving the first delimiter;

generating a second signal in response to the second shift register receiving the second delimiter;

generating a control signal after generation of both the first and second signals;

generating first and second multiplexer control signals, respectively, in response to generating the control signal;

multiplexing data contents of a stage of the first shift register onto a first output line in response to generation of the first multiplexer control signal;

multiplexing data contents of a stage of the second shift register onto a second output line in response to generation of the second multiplexer control signal.

20. The method of claim 19:

detecting the presence of the first and second delimiters, respectively, within the first and second shift registers, respectively;

wherein the first and second signals are generated in response to detecting the presence of the first and second delimiters, respectively, within the first and second shift registers, respectively.

* * * * *